(12) United States Patent
Wallace et al.

(10) Patent No.: US 6,338,461 B1
(45) Date of Patent: Jan. 15, 2002

(54) EVAPORATIVE COOLERS

(75) Inventors: Allan Kenneth Wallace; James Robert Harrison, both of South Australia (AU)

(73) Assignee: FF Seeley Nominees Pty Ltd (AU)

( * ) Notice: Subject to any disclaimer, the term of this patent is extended or adjusted under 35 U.S.C. 154(b) by 0 days.

(21) Appl. No.: 09/461,783

(22) Filed: Dec. 15, 1999

(30) Foreign Application Priority Data

Oct. 18, 1998 (AU) .............................................. PP7790

(51) Int. Cl.⁷ .............................................. A47G 29/02
(52) U.S. Cl. .............................. 248/237; 52/27; 52/29; 248/188.2; 248/188.5; 248/685; 248/688; 62/259.1; 62/604
(58) Field of Search .............................. 248/237, 188.2, 248/188.5, 685, 688; 52/29, 27; 62/259.1, 604; 182/45

(56) References Cited

U.S. PATENT DOCUMENTS

| | | | | |
|---|---|---|---|---|
| 3,603,547 A | | 9/1971 | Hills | |
| 3,710,520 A | * | 1/1973 | Federowicz | 52/27 |
| 4,369,148 A | * | 1/1983 | Hawkins | 261/36 R |
| D298,276 S | | 10/1988 | Butcher | |
| 4,781,401 A | * | 11/1988 | Sharp | 285/44 |
| 4,819,448 A | * | 4/1989 | Campbell et al. | 62/304 |
| 5,979,600 A | * | 11/1999 | Bitner | 182/45 |
| 6,047,935 A | | 4/2000 | Wright | |

* cited by examiner

Primary Examiner—Carl D. Friedman
Assistant Examiner—Patrick J. Chavez
(74) Attorney, Agent, or Firm—Watts, Hoffman, Fisher & Heinke, Co. LPA

(57) ABSTRACT

A support structure for interposition between a base of a sloping base cooler and a roof during installation of the cooler onto the roof. The support structure comprises a transition component adapted to be connected to the cooler and to ducting protruding through the roof to feed cooled air from the cooler into the ducting. The transition component includes a movable prop or flap, separate from or formed with the transition component, to be positioned between the transition component and a horizontal surface such that the transition component, when fitted to a sloping base cooler, maintains the cooler in a vertically upright condition for assembly or transportation or storage.

16 Claims, 4 Drawing Sheets

EVAPORATIVE COOLERS

FIELD OF INVENTION

The present invention relates to the support for transportation, installation and support after installation of evaporative air coolers manufactured with the base of the cooler set at a slope the horizontal plane when in situ.

DESCRIPTION OF THE PRIOR ART

Evaporative air coolers are used to cool domestic and industrial premises. These coolers are normally mounted on the roof of the premises directly to the ductwork used to convey the air from the cooler to an air distribution system within the ceiling space under the roof of the building.

The design and appearance of evaporative air coolers used for this purpose has undergone evolutionary changes over a number of years to the current situation of highly attractive and functional units being available which enhance the appearance of the building. A more recent change in the design of the cooler has been to make the shape of the cooler a closer fit to the shape of the sloping roof on which it is mounted. In these coolers, the base or tank section of the cooler slopes at approximately the slope of the roof, while the upper part of the cooler retains the conventional rectangular form. While attractive in its final installation on a roof, this overall shape of the cooler presents a number of problems in manufacture, storage, transportation and installation. The present invention addresses these problems by providing a means of easily making, moving and fixing the cooler to its final location.

The sloping lower surface of the cooler prevents the cooler from sitting upright on a transport pallet during manufacture and storage. Prior art solutions to this problem have used some means of packing the sloping space to return the cooler to its upright position. The packers required are bulky and expensive to make even if from low grade materials. They have no further use after delivery of the cooler to site and must then be disposed of.

A further problem presented by the sloping lower surface of the cooler relates to its installation on the mounting, which also serves as the means of delivering the air flow from the cooler. While a conventional rectangularly shaped cooler can readily be mounted on a mounting duct installed vertically through the roof, the mounting of a cooler with a sloping lower surface preferably employs a mounting duct set at an angle to the vertical. This orientation presents many practical problems during the installation including difficulties in determining the correct angle to set the duct, setting the vertical position such that the cooler does not touch the roof and final filament of the cooler to the ducting once the duct is accurately positioned. The present invention solves these problems by offering a complete system to allow a simple and accurate means of setting the cooler at the correct angle and position for optimum performance and operation.

Fixing of the cooler to the ducting presents further problems to the installer. Since the ducting is sloped to the vertical in the design of cooler referenced by this document, the cooler could be unstable when mounted on the ducting and until fasteners can be fitted between the cooler and ducting. If fasteners are required, this would necessitate two persons remaining with the cooler during the fitting of fasteners, whereas the task of fixing the cooler would be immediately completed if there were no need for fasteners.

It is apparent that all dwellings to which a cooler of this design may be fitted do not have the same slope of roof. While a cooler can be designed to fit the most common slope of roof, and can also be designed to accommodate a range of slope within reasonable limits, there will be roofs which are either too steep or too flat to allow total support for the weight of the cooler through the mounting duct. On such roofs, some supplementary means of support of the cooler weight will be required. While such support can be provided by a supplementary frame or similar, such a construction is obviously inconvenient and expensive to those charged with the installation of the cooler. It is apparent that the task of the installer would be greatly simplified if the means of supplementary support, if required, were inbuilt into the structure of the cooler or readily connectable between the cooler and sloping roof.

The present invention in its most preferred form addresses all of these problems in relation to a sloping base cooler.

SUMMARY OF THE INVENTION

In accordance with a first aspect of the present invention there is provided a support structure for interposition between a base of a sloping base cooler and a roof during installation of the cooler onto the roof, said structure comprising a transition component adapted to be connected to the cooler and to ducting protruding through the roof to feed cooled air from the cooler into the ducting.

Preferably the transition component is a single piece plastics moulding.

More preferably, the transition component includes a movable prop or flap, separate from or formed with the transition component, to be positioned between the transition component and a horizontal surface such that the transition component, when fitted to a sloping base cooler, maintains the cooler in a vertically upright condition for assembly or transportation or storage. By this means the cooler, transition component and prop occupy an overall rectangular prismatic space which can be readily packaged for transportation or storage.

In a further preferred embodiment the transition component incorporates posts or clips which locate and position the base of a cooler against the transition component.

As herein employed, the term "comprising" or its variations is to be taken as inclusive and not exclusive of other integers when describing or defining this invention and its embodiments.

BRIEF DESCRIPTION OF THE DRAWINGS

The present invention will now be described by way of example with reference to the accompanying drawings in which:

In FIG. 1, evaporative air cooler 1 is shown with it's base set at a slope to the horizontal, immediately prior to the assembly of the cooler 1 to the mounting transition 2 and pallet 5 for transportation.

In FIG. 2, one piece transition moulding 2 is shown exploded away from the support pallet 5. When assembled to the pallet 5 for transportation, the mounting transition 2 is fastened to pallet 5 at hinged, fold down extension 9 to the mounting transition 2, with fasteners such as screws (see FIG. 1). The rear flap or prop 3, which is moulded as part of the mounting transition 2 moulding with a plastic hinge along edge 10, is swung down and fastened to the pallet 5. Alternatively, the rear flap 3 can be detached from the mounting transition moulding 2 and fastened separately to the mounting transition 2 as illustrated in FIG. 2. The mounting transition 2 is now in a position and orientation to support the cooler 1 firmly for transportation, in an overall cubic shaped package. The cooler 1 is attached to the mounting transition 2 with a plurality of clips 4, moulded as an integral part of the mounting transition 2. No additional fasteners are required to retain the cooler 1 to the mounting transition 2, either for transportation or for final installation on the roof.

When the cooler 1 is installed on the roof of the dwelling, pallet 5 is dismantled and parts of the pallet 5 can be used as gauges to provide clearance from the roof as shown in FIG. 3. In FIG. 3, parts 13 and 14 are components of the pallet 5 after it has been dismantled. The dimensions of these components of pallet 5 are such that they can be used as a template thus ensuring that the correct clearances from the roof are achieved when installing the cooler. This process ensures that the cooler 1 will not interfere with the roof whatever the roof slope.

Figure 1:
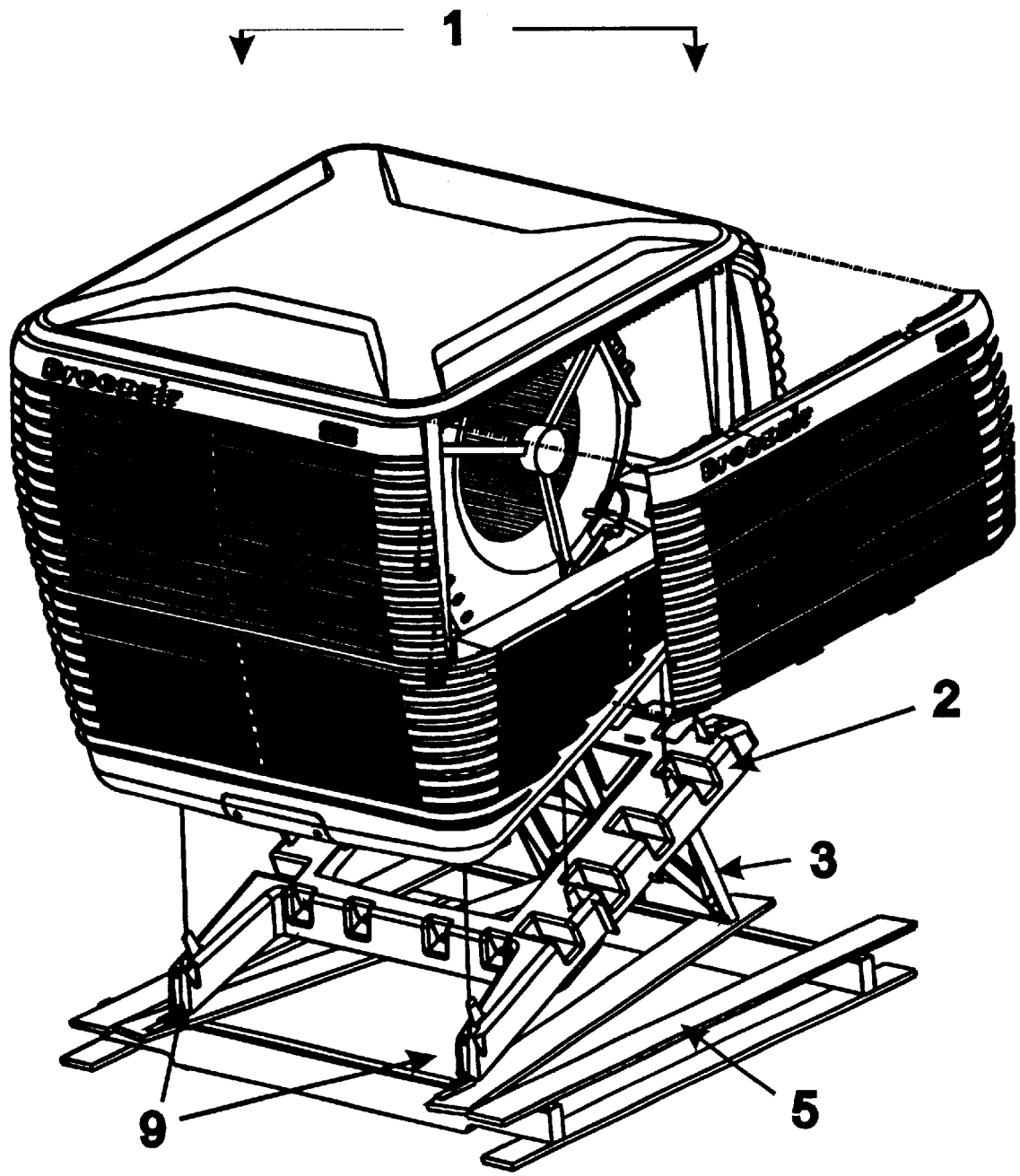
FIG. 1 is a perspective view of a cooler showing the relationship to an embodiment of a mounting transition and a transportation pallet.
Figure 2:
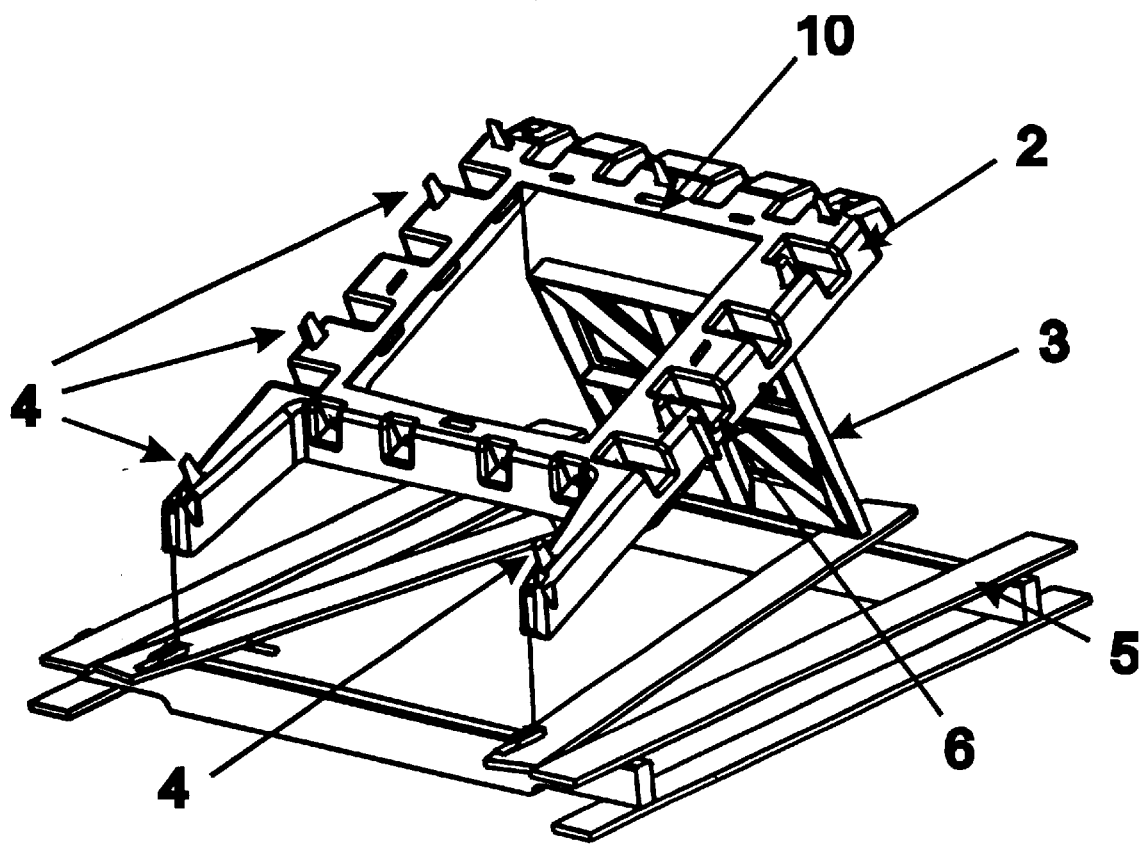
FIG. 2 is a detailed perspective view showing the assembly of a mounting transition embodiment to a transportation pallet.
Figure 3:
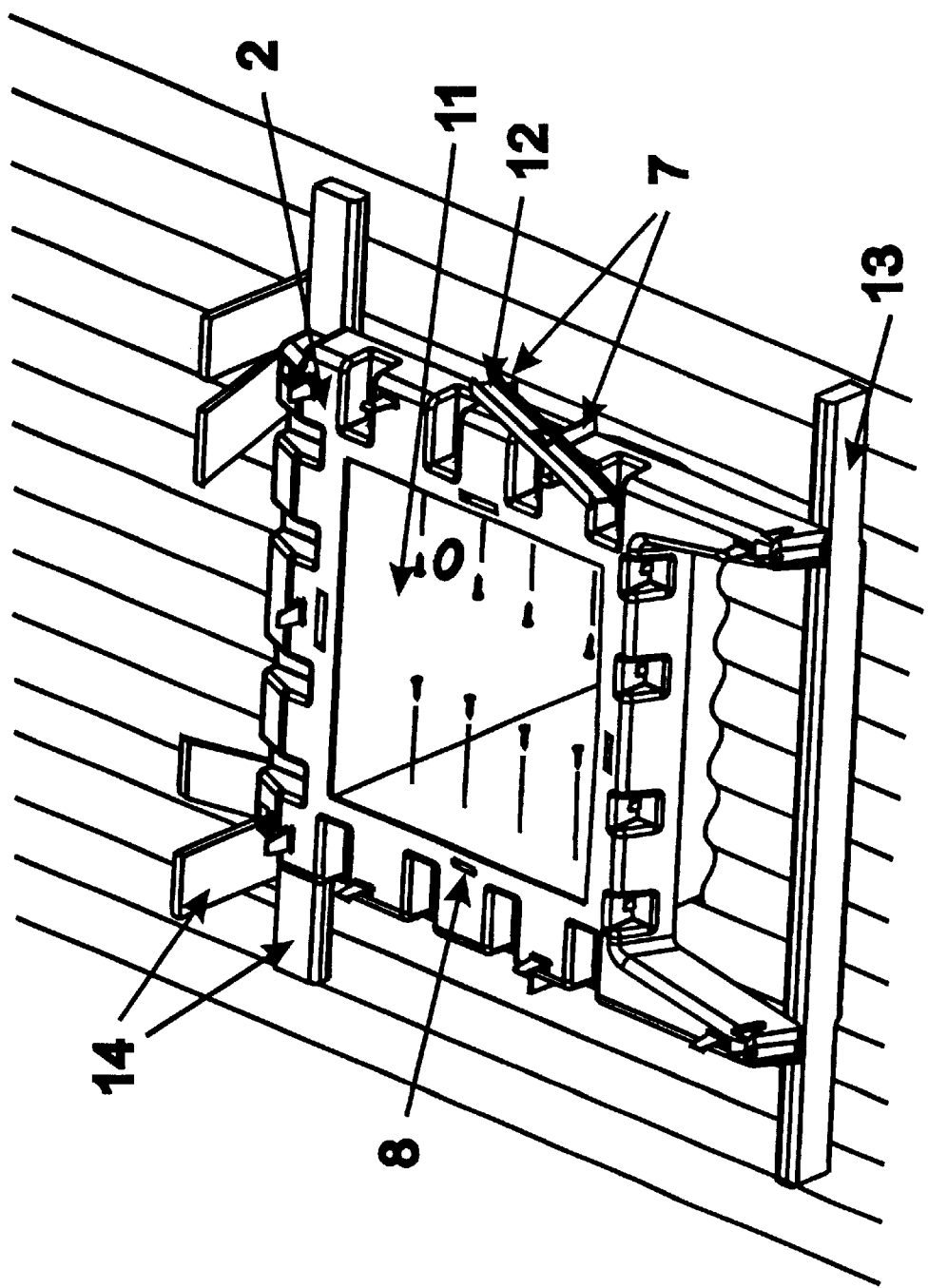
FIG. 3 shows the mounting transition component of FIGS. 1 and 2 and its installation to a mounting duct.

During installation, the mounting transition 2 is fixed to the ducting 11 using fasteners driven through the recesses or concealed wells 6 in mounting transition 2 and shown in FIG. 2. The level of the assembly is checked by either applying a conventional spirit level 12 to the spirit level pegs 7, or fitting spirit level vials to the spirit level wells 8 provided in the mounting transition moulding 2. The ducting 11 is fastened to the roof structure when the levels applied to the mounting transition 2 by either of these methods indicate the correct level for the installation of the cooler 1.

Figure 4:
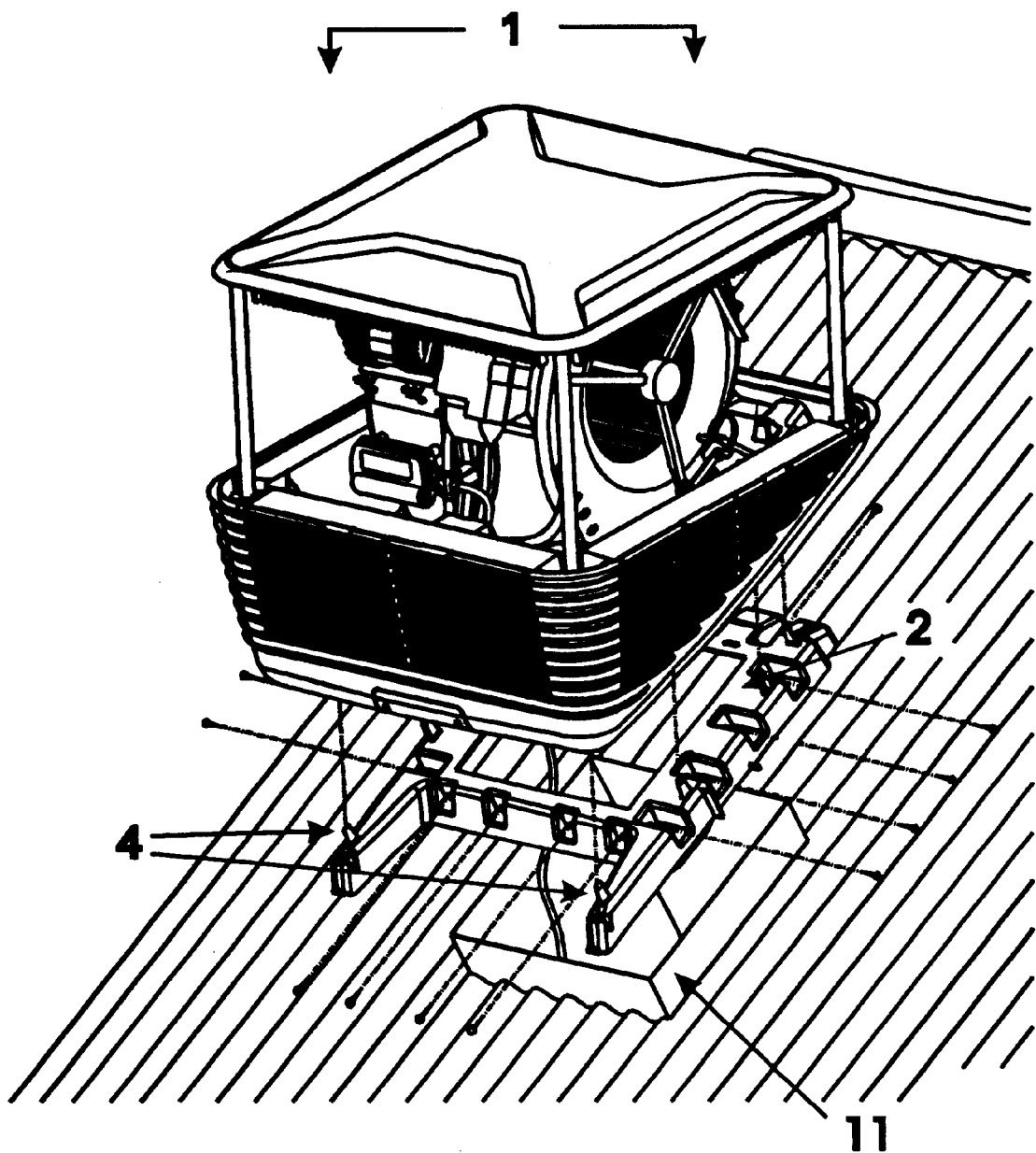
FIG. 4 shows the mounting of a cooler to the mounting transition component of FIGS. 1 and 2 and a duct on a sloping roof.

When all fixings of the ducting 11 and mounting transition 2 have been made, the cooler 1 is fitted to the mounting transition 2 as shown in FIG. 4. When the cooler 1 is in the correct position over the mounting transition 2, clips 4 engage to hold it in position, without the need for any additional fasteners.

The application of the above described embodiment of the present invention to the cooler design provides an inexpensive and effective solution to the problem of transportation of a cooler. The problems of mounting a sloping base cooler on the mounting duct are greatly relieved by the features in the embodiment, allowing the installer to accurately and easily fit the cooler to a dwelling.

What is claimed is:

1. An air cooler transition fitting for connecting an air cooler unit to a duct communicating with a building interior comprising;
    a. A unitary polygonal body having a through aperture adapted to be connected to such a duct in surrounding relationship;
    b. The body further including a set of fastener apertures each extending from an external surface through the body into communication with the through aperture for receipt of fasteners for connecting the body to such duct when the fitting is in use; and
    c. Connectors projecting from the body for positioning and retention engagement with such a unit when the fitting is in use
    further including a prop for supporting such fitting at an angle with the horizontal.

2. The fitting of claim 1 wherein the body and prop are connected by a plastic hinge and the body, prop and hinge are a unitary molded plastic fitting.

3. In combination with the fitting of claim 1, a cooler connected to the fitting by interaction of the connectors and the cooler.

4. A process of installing an air conditioner unit over a building roof comprising:
    a. Mounting a transition fitting by locating the fitting relative to a duct projecting above a building roof;
    b. The mounting step including:
        i. Orienting the fitting such that an upper surface of the fitting is positioned to support the unit in an upright position; and
        ii. Securing the unit to the fitting; and,
    c. Mounting the unit on the fitting by utilizing coacting surfaces of the fitting and the unit to connect the unit and the fitting together.

5. The process of claim 4 further including the step of transporting the unit and the fitting to a site for the installation, the unit and the fitting being connected together during the transportation step.

6. The process of claim 5 further including disconnecting the fitting from the unit following the transportation step and prior to the installation.

7. An air cooling system comprising:
    a) an air cooler including housing having a top surface for generally horizontal orientation when the system is shipped and when the system is in use;
    b) the housing including a base surface oriented at an acute angle with the horizontal when the system is shipped and when it is in use;
    c) a transition fitting having a connection section secured to the housing adjacent the base surface;
    d) the fitting also including a support section hingedly connected to the connection section; and,
    e) the fitting also including a prop for interposition between the sections to support the cooler in an upright condition when the support section is resting on a floor for storage or shipment of the system.

8. The system of claim 7 wherein the connection section includes clips coacting with the housing to secure the cooler and fitting together.

9. The system of claim 7 wherein the connection section includes fastener apertures for receiving fasteners to secure the connection section to an air duct.

10. The system of claim 7 wherein the prop is connected to a selected one of the sections by a plastic hinge.

11. The system of claim 10 wherein the selected one is the connection section.

12. The system of claim 11 wherein the sections are integrally molded plastic pieces.

13. An air cooling system comprising:
    a) a transition fitting connected to an air duct and oriented at an angle with the horizontal;
    b) an air cooler including housing having a top surface in a generally horizontal orientation; and
    c) a transition fitting having a connection section secured to the housing adjacent the base surface by clips integrally formed in a selected one of the housing and the fitting coacting with surfaces on the other of the fitting and the housing.

14. The system of claim 13 wherein the connection section is the selected one.

15. The system of claim 13 wherein the connection section includes fastener apertures receiving fasteners securing the connection section to the air duct.

16. The system of claim 13 wherein the fitting is an integrally molded plastic piece.

* * * * *